Figure 1:
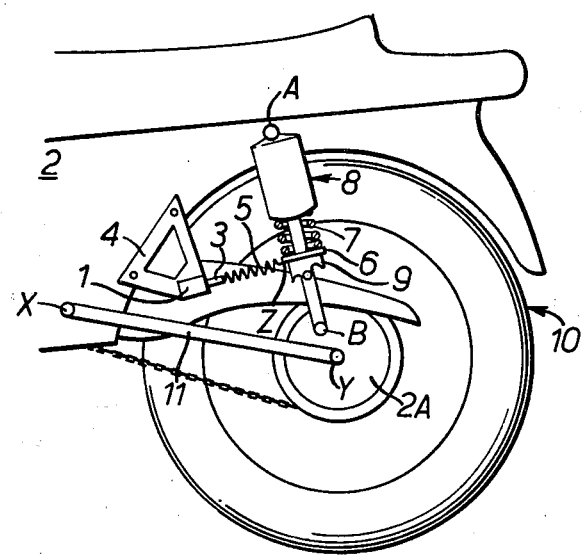

United States Patent [19]

Hess

[11] 4,418,800
[45] Dec. 6, 1983

[54] MOTORCYCLE BRAKING SYSTEM HAVING LOAD SENSITIVE PRESSURE CONTROL VALVE

[75] Inventor: Wolfgang Hess, Koblenz, Fed. Rep. of Germany

[73] Assignee: Lucas Industries Limited, Birmingham, England

[21] Appl. No.: 271,104

[22] Filed: Jun. 8, 1981

[30] Foreign Application Priority Data

Jun. 12, 1980 [GB] United Kingdom ............... 8019269

[51] Int. Cl.$^3$ .............................................. B60T 8/22
[52] U.S. Cl. ................................... 188/195; 180/227; 188/344; 267/177; 303/22 R
[58] Field of Search ............... 303/22 R, 6 C, 22 A; 188/195, 344, 349, 321.11, 24.11, 24.15, 2 A, 271, 322.22; 180/227; 267/8 R, 8 B, 8 C, 34, 33, 60, 62, 61 R, 61 S, 166, 167, 172, 177, 179, 178, 173

[56] References Cited

U.S. PATENT DOCUMENTS 2,756,045  7/1956  Savory ............................. 267/8 R
4,322,088  3/1982  Miyakushi et al. ............ 180/227 X

FOREIGN PATENT DOCUMENTS 1267513  3/1972  United Kingdom .
1425417  2/1976  United Kingdom .
2027504  2/1980  United Kingdom ............... 188/195
2077871  12/1981 United Kingdom ............... 188/195

Primary Examiner—Douglas C. Butler
Attorney, Agent, or Firm—Scrivener, Clarke, Scrivener and Johnson

[57] ABSTRACT

A load conscious control valve arrangement for modifying the pressure applied to the rear hydraulic brake of a motor cycle comprises a control valve rigidly mounted by a bracket on the frame of the motor cycle. The stem of the control valve is connected by a tension spring to an adjustable spring support of a combined spring/damper suspension strut. Deflection of the rear suspension as a result of increased loading causes an increased tension to be applied by the spring and thereby increases rear brake pressure. To compensate against the decrease in tension which would otherwise be applied to the valve stem when the adjustable stop is adjusted but there is no increase in the load on the motor cycle, an eccentric formed on the adjustable stop so that rotation of the stop may be provided to adjust the suspension strut causes a shift in the radial direction of the suspension strut of the point Z at which the spring is connected to the spring support.

6 Claims, 10 Drawing Figures

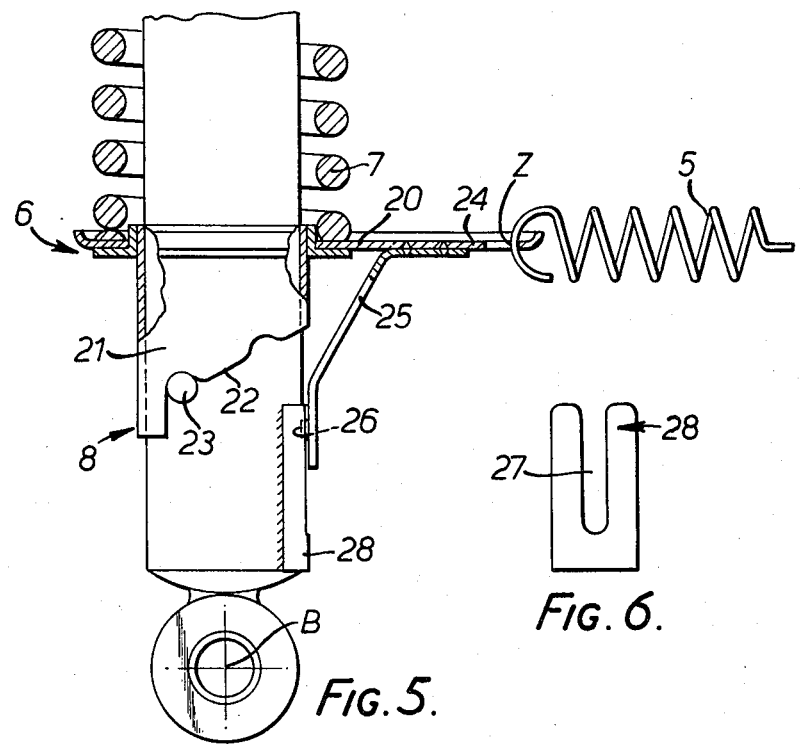
FIG. 5.
FIG. 6.
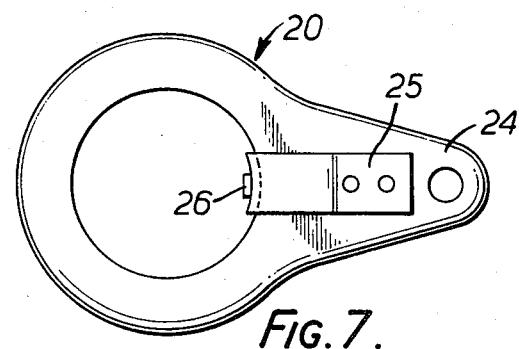
FIG. 7.

MOTORCYCLE BRAKING SYSTEM HAVING LOAD SENSITIVE PRESSURE CONTROL VALVE

This invention relates to control valve arrangements for motor cycle braking systems.

Previous attempts have been made to design and develop a braking system for a motor cycle in which both the front and rear wheel brakes were operated mechanically simultaneously by a single actuator, but the resulting mechanism had the disadvantages that it was complex, awkward to manufacture, and it was difficult to achieve balanced braking without requiring frequent resettings and readjustment of the various mechanical linkages.

Because of the foregoing disadvantages, the majority of presently produced motor cycles use separately operated front and rear wheel brakes.

However, with the advent of hydraulically actuated brakes for motor cycles, it has become feasible to produce the kind of brake system in which a single pressure source, or alternatively a dual pressure source operated by a single actuator, supplies pressure to both front and rear wheel brakes simultaneously. Nonetheless, the problem of achieving the correct front-to-rear brake torque balance still remains, and since motor cycles generally have a relatively shortwheelbase, the degree of weight transfer under braking is even more significant than in the case of a motor car. This serves to accentuate brake balance problems.

In addition to the problem of weight transfer under braking, there is also the problem of changes in static loading of the motor cycle caused, for example, by a pillion passenger. Several attempts have been made to compensate for changes in static loading by manually altering the length of a suspension strut, for example as shown in British Patent Specification No. 1,267,513. As shown in that specification the strut characteristics are changed by altering the axial position of a collar which serves as an abutment for the strut suspension spring.

In a previously proposed attempt to solve the above-mentioned problems, as shown in British Specification No. 2,027,504 a motor cycle suspension system has been proposed which has an adjustable strut connected between a sprung and an unsprung part of the cycle and having a suspension spring located between an adjustable collar and a spring support plate secured to the sprung cycle part. The support plate also rigidly supports a control valve for controlling pressure applied to a wheel brake, the control valve being operable in response to the force applied to the valve by a control coil compression spring connected through a linkage to the spring support plate. The linkage thus provides part of a mechanical connection between the ends of the suspension spring. Thus, changes in static or dynamic loading of the motor cycle cause variations in the length of the suspension spring and hence variations in the load of the control spring acting on the valve, thereby altering the valve characteristics.

The previous proposal has a number of disadvantages, amongst which are that the control spring is a compression spring which, in use, tends to kink and requires support by a guide or casing to prevent or reduce such kinking, the provision of the casing adding to the cost of manufacture and assembly. Furthermore, since the control valve is connected directly to the suspension strut, it follows the angular movements of the strut, with the result that the valve has to be connected to the pressure source and the brakes by flexible hoses to allow for such movement.

Figure 2:
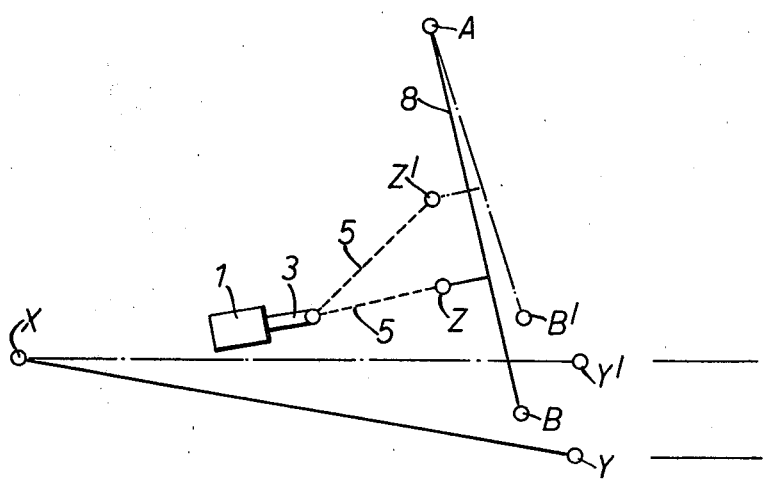

Another disadvantage of the prior proposal is that if the control valve is simply connected to an existing strut, as shown in FIG. 2 of the said British Patent Specification No. 2,027,504, the control spring undergoes the same changes in length as the suspension spring, which may be substantial. To overcome the last-mentioned problem, the prior British Specification No. 2,027,504 shows in FIG. 3 the provision of a separate spring portion located between the support plate and the suspension spring, the deflections of that portion being sensed by the valve control spring. However, such an arrangement requires a separate plate to be welded, or otherwise attached, to the top of the suspension spring and the additional expense of the separate spring portion. The arrangement is also not readily usable on existing motor cycle suspension struts.

The aim of the present invention is to obviate, or at least reduce the effect of, one or more of the above-mentioned disadvantages.

In accordance with one aspect of the invention, there is provided a control valve arrangement for a braking system of a motor cycle having a manually adjustable suspension strut connected between the sprung and unsprung parts of the motor cycle, the strut having an adjustable spring support for a suspension spring, said arrangement comprising a control valve for controlling fluid pressure applied to a wheel brake, the control valve being separate from the strut and being mounted on one of the sprung part or unsprung part of the motor cycle, and coupling means connected between the control valve and the adjustable spring support applying a force to the control valve, the coupling means including resilient means operable to vary the force applied to the control valve in dependence upon the relative position of the sprung and unsprung parts of the motor cycle.

Preferably, the valve is mounted on the frame of the cycle which constitutes the sprung part.

The resilient means is preferably a tension spring.

In accordance with another aspect of the invention, there is provided a manually adjustable suspension strut having an adjustable support for a suspension spring, said support comprising means for attachment of a control spring of a pressure control valve arrangement to a point on said support, and adjusting means for varying the position of said point of attachment relative to the axis of the strut.

Preferably, the adjusting means comprises an eccentric collar fixed to the periphery of the strut and an annular member mounted on said collar, said annular member having said means for attachment of the control spring, wherein rotation of the annular member alters the position of the point of attachment of the control spring relative to the strut axis.

However, other adjusting means are possible, as described in more detail below.

Figure 3:
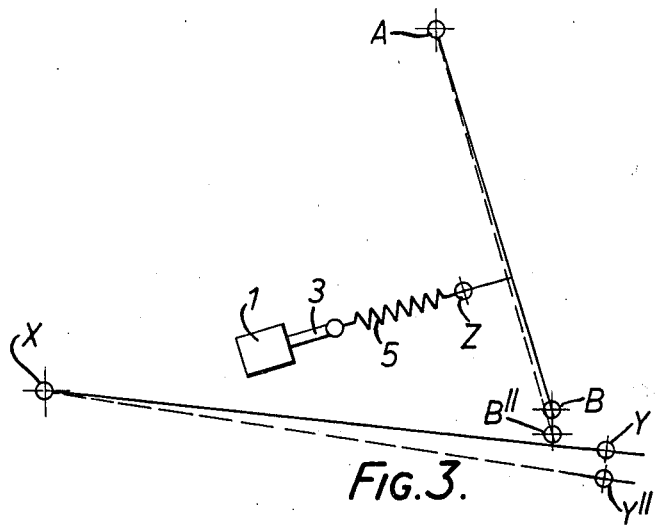
Figure 4:
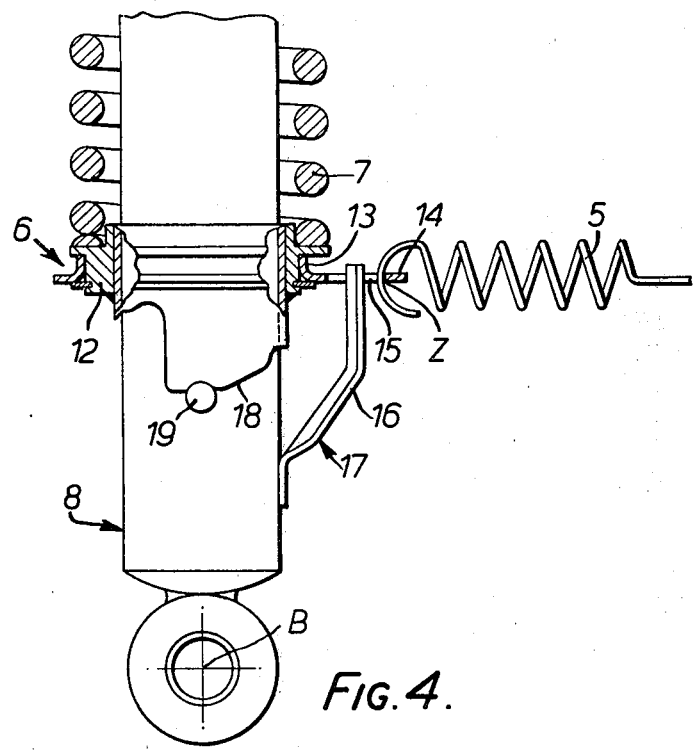
Figure 8:
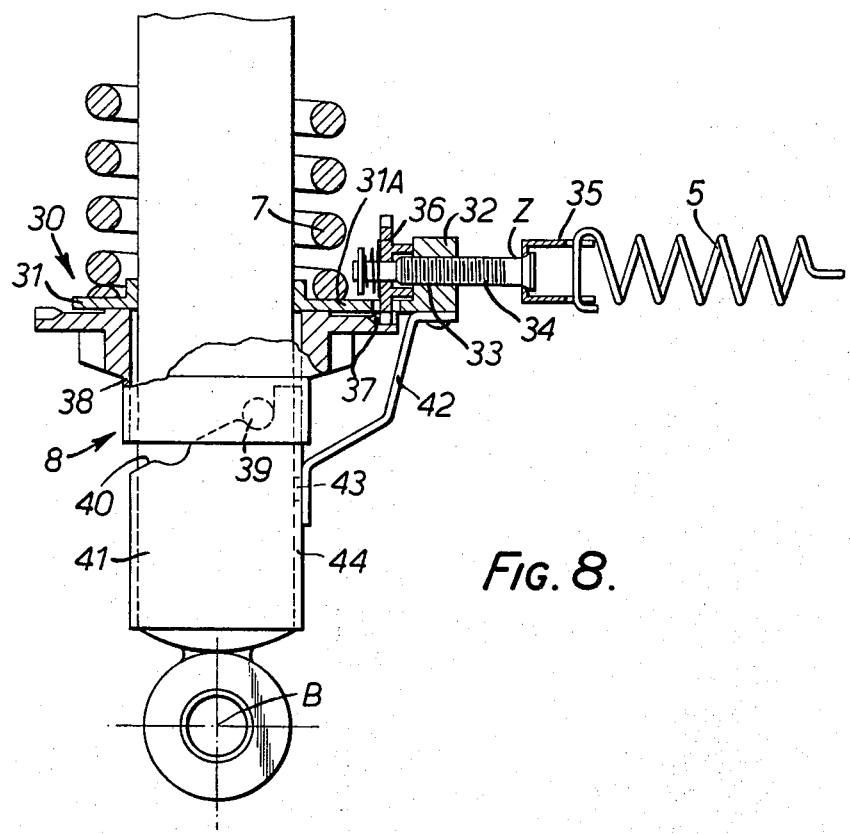
Figure 9:
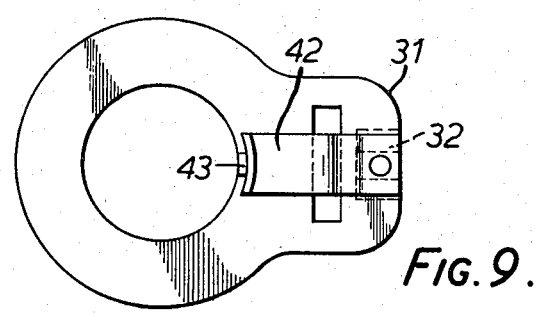
Figure 10:
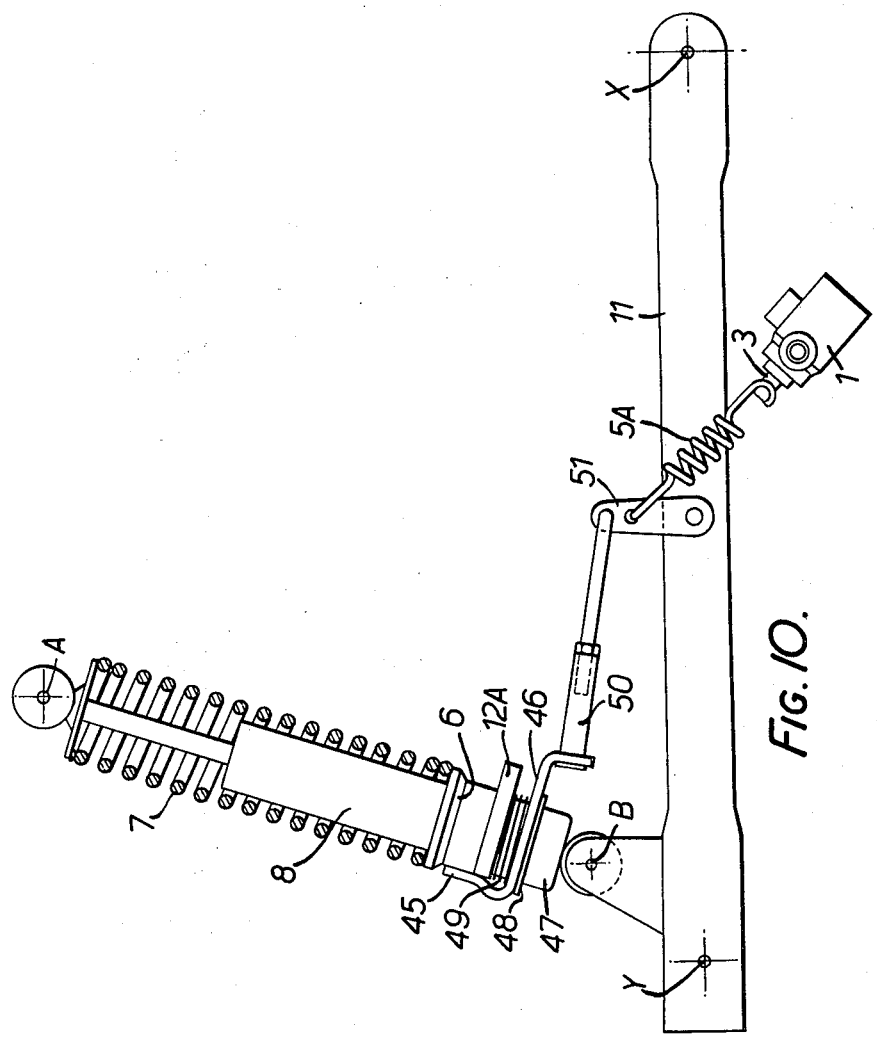

A control valve arrangement in accordance with the invention on a motor cycle braking system will now be described, by way of example, with reference to the accompanying drawings, in which:

FIG. 1 is a diagrammatic elevational view of the arrangement on the rear of a motorcycle, FIG. 2 is a schematic view of the arrangement of FIG. 1 illustrating the components in different conditions of loading of the motor cycle, FIG. 3 is a schematic view of the arrangement of FIG. 1 illustrating the components in different conditions of adjustment, FIG. 4 is a view of part of an adjustable suspension strut suitable for use in the arrangement of FIG. 1, shown partly in section, FIG. 5 is a view similar to FIG. 4 of another strut, FIG. 6 is a detail end view showing a component of the strut of FIG. 5, FIG. 7 is a detail plan view of a suspension spring support of the strut of FIG. 5, FIG. 8 is a view similar to that of FIG. 4 of another, different strut, FIG. 9 is a detail plan view of a suspension spring support of the strut of FIG. 8, and FIG. 10 shows a side view of a further embodiment of the invention.

Referring to FIG. 1, there is shown part of a motor cycle having a fluid-operated braking circuit incorporating a control valve 1. The control valve 1 has a valve stem 3 subjected to a force which is dependent upon vehicle loading, as will be described. A suitable form of control valve is described and illustrated in British Patent Specification No. 1,425,147. The control valve 1 is connected in the circuit from a fluid pressure source to the rear wheel brakes and modifies the pressure applied to the rear wheel brakes, as compared to full braking pressure applied to the front wheel brakes, the pressure being modified after a "cut-in" pressure, which is dependent upon the force applied to stem 3, is attained.

The control valve 1 is attached to the frame 2 of the motor cycle by a bracket 4, and the valve stem 3, which is movable axially to control operation of the valve, is subjected to the variable force by a control tension spring 5, one end of which is connected to the valve stem 3. The other end of the control spring 5 is connected at a point Z to a support 6 for the suspension spring 7 of a combined coil spring and damper suspension strut 8. The spring support 6 is adjustable by an adjuster 9 as will be described below.

The suspension strut 8 is mounted at points A and B respectively between the frame 2 and the hub 2A of the rear wheel 10. Thus, one end of control spring 5 is connected through the valve 1 to the frame 2 which constitutes the sprung part of the motor cycle, and the other end of the control spring 5 is connected to the spring support 6 which is part of the unsprung part of the motor cycle.

The wheel 10 is also supported by an arm 11 which is rotatably connected at point X to the frame 2 and is connected at point Y to the hub 2A of wheel 10.

Referring to FIG. 2, the positions of the components relative to the frame 2 in the laden condition of the motor cycle are illustrated in chain link lines and the positions in the unladen condition are illustrated in full lines.

When the vehicle is laden the suspension spring 7 is compressed and the points B,Y move to positions B',Y' relative to the frame 2. The length of the control spring 5 is thus increased to increase the force on the valve stem 3. This increase in force on the valve stem 3 has the effect of increasing the "cut-in" pressure of the control valve 1. Thus, when the motor cycle is laden, e.g. by a particularly heavy rider or a pillion passenger, the braking effect of the rear wheel brake is increased.

If the rear wheel load is decreased, due to removal of static load or due to weight transfer to the front wheel during braking, the suspension spring 7 increases in length and the length of the control spring 5 is decreased and the "cut-in" pressure is decreased to effectively reduce the rear wheel braking pressure.

The amount of extension of the control spring 5 is less than the change in length of the suspension spring 7 and less than the deflection of the sprung part 2 relative to the axle of wheel 10.

The control valve 1 may be a pressure limiting valve, which limits the rear wheel brake pressure to a value dependent upon the loading of the rear wheel, or a pressure reducing valve which reduces the rear wheel brake pressure as compared to the full pressure applied to the front wheel brakes.

As described, the control valve 1 is self-adjusting in dependence upon changes in both static loading, due for example to a pillion passenger getting on or off the motor cycle, and dynamic loading, caused by braking. In both cases the rear wheel braking is adjusted to provide a good rear wheel/front wheel brake ratio.

In preferred embodiments described in more detail below, the length of the strut 8 is manually adjustable to assist in coping with static load changes, for example preparatory to a pillion passenger getting on the cycle, by adjusting the position of the spring support 6 relative to the connecting point B. Since for any given load the length of the suspension spring 7, i.e. the distance AZ is constant, adjusting the spring support 6 without changing the loading on the suspension strut 8, e.g. without adding a pillion passenger, leaves the distance AZ unaltered but changes the distance ZB in order to change the overall length AB of the strut 8. Only when the strut load changes, for example when the pillion passenger gets on or off the cycle, does the distance AZ change.

As best seen in FIG. 3, the adjustment of the suspension strut 8 without altering the load on the suspension strut causes the point B to move to B'' and thus the point Y to move to Y'''. Although the distance AZ is unchanged, there is a slight change $\alpha$ in the angle between strut and the frame 2 of the motor cycle. Hence, adjusting the spring support 6 without altering the loading on the strut 8 causes the load of the control spring 5 of the valve to change slightly. This is undesirable.

In order that only the changes in the length AZ of the suspension spring 7 i.e. changes in strut loading, should alter the characteristics of the valve 1 the preferred embodiments of the invention include means whereby the force of control spring 5 is not changed during manual adjustment of the strut. Several forms of strut for achieving that end will now be described.

Referring to FIG. 4, the spring support 6 comprises an eccentric collar 12 around which is rotatably mounted an annular connecting member 13 having a projection 14. The projection 14 has an aperture 15 through which passes an upstanding spigot 16 of a locating member 17 secured to the strut 8, the member 17 preventing rotation of the connecting member 13. The aperture 15 also receives one end of the control spring 5.

The collar 6 has a lower cam surface 18 which co-operates with a stop 19 fixed to the strut 8. The cam surface 18 is preferably so shaped that several stable positions of adjustment can be obtained by rotation of the collar 12.

To adjust the strut length, the collar 12 is rotated to engage the stop 19 in a different portion of the cam surface 18, thus altering the distance ZB. During rotation of the collar 12, the eccentricity of the collar causes movement of the projection 14 radially relative to the axis of the strut 8. The amount of eccentricity is chosen such that the radial movement compensates for the small change α in the angle of the strut and thus there is no change in the tension of control spring 5.

FIGS. 5 to 7 show an arrangement for securing the control spring 5 to the strut in which the tension of control spring 5 does change during adjustment of the length of strut 8 due to the change α in the angle of the strut. In this embodiment the spring support 6 comprises a plate 20 which seats on a cam 21 having a cam surface 22 engaging a stop 23. Preferably, there is provided a low-friction washer between the plate 20 and cam 21 to permit easy relative rotation. The plate 20 has projection 24 for securing the spring 5.

The construction of the arrangement of FIGS. 5 to 7 is similar to that of FIG. 4, except that the cam 21 is not eccentric and that the projection 24 has a downwardly depending guide member 25 having a spigot 26 which engages in a slot 27 formed in an attachment 28 connected to the strut 8. The connection between the slot 27 and the spigot 26 ensures that the plate 20 does not rotate relative to the strut 8.

In FIGS. 8 and 9 there is shown a strut 8 having a suspension spring support 30 which is adjustable to perform a function similar to that of the strut of FIG. 4. In the FIGS. 8 and 9, the support 30 comprises a plate 31 having a projection 31A which has an upstanding portion 32. The upstanding portion 32 has a screw-threaded bore 33 which receives a complimentary screw-threaded shaft 34 of an adjuster mechanism. Connected to one end of the shaft 34 is a yoke 35 to which is secured the control spring 5. The other end of the shaft 34 carries a gear 36 which co-operates with a gear 37 formed on a rotatable collar 38 mounted on the strut 8. Attached to the collar 38 is a pin 39 which engages with a cam surface 40 of a cam 41 secured to the lower part of strut 8.

As in the embodiment of FIGS. 5 to 7, there is provided a downwardly depending guide member 42 fixed to the collar 38 and having a spigot 43 engaged in slot 44 formed in an attachment 45 secured to the strut 8.

In operation, as the collar 38 is adjusted to adjust the strut length, the gears 36,37 rotate relatively to effect rotation of the shaft 34 and compensate for changes in tension of control spring 5 which would otherwise be caused by the change α in the angle of the strut.

The above-described valve arrangements have the advantages that since the valve is separate from the suspension strut, the control spring 5 may be a tension spring, which needs no guide or casing to prevent kinking, and the deflection of the control spring 5 need not be the same as the change in length of the suspension spring. Furthermore, no direct mechanical connection is required between the two ends of the suspension spring and the valve. Since the valve is not directly fixed to the strut, it does not need to be subjected to the angular movements of the strut and rigid fluid pipes and couplings can be used for the valve.

It will be appreciated from the foregoing that the above-described valve arrangement can readily be used with known suspension struts without substantial modification of the strut.

Referring now to FIG. 10 a further embodiment of the invention is shown. In this embodiment where applicable like reference characters have been used to those used in the previously described embodiments.

In the embodiment of FIG. 10 the suspension strut 8 includes an adjustable spring support 6 similar to that shown in FIG. 4. The spring support 6 is provided with an eccentric portion 12A which engages an upstanding portion 45 of a bracket 46. The bracket 46 includes an elongate slot in which is received the body 47 of the damper of the suspension strut 8. The bracket 46 is biased against a flange 48 secured to the body 47 by a spring 49 so that rotation of the eccentric 12A during adjustment of the spring support 6 causes lateral sliding movement of the bracket 46 along the support flange 48. An adjustable connecting rod 50 connects the bracket 46 to an arm 51 which is pivotally mounted on the trailing arm 11 of the motor cycle suspension. A control spring 5A connects the arm 51 to the stem 3 of a control valve 1 mounted on the motor cycle frame.

In use, if the spring support 6 is adjusted and the load on the rear suspension strut is not changed, lateral sliding movement of the bracket 46 caused by the eccentric 12A compensates for small changes in angle of the suspension strut and accordingly the braking characteristics of the rear brake are unaltered. However, changes in static or dynamic loading on the rear suspension strut cause changes in the angle of the suspension strut to the trailing arm, and changes in the angle of the trailing arm relative to the fixed frame. These changes are applied by way of connecting rod 50, arm 51, and spring 5A to the stem 3 of valve 1 in order to provide suitable modification of the rear brake characteristics.

I claim:

1. A control valve arrangement for a braking system of a motorcycle having a manually adjustable suspension strut connected between the sprung and unsprung parts of the motorcycle, the strut having an adjustable spring support for a suspension spring, said arrangement comprising a control valve for controlling fluid pressure applied to a wheel brake, the control valve being separate from the strut and being rigidly mounted on the frame of the motorcycle, and coupling means connected between the control valve and the adjustable spring support applying a force to the control valve, the coupling means including a tension spring operable to vary the force applied to the control valve in dependence upon the relative position of the sprung and unsprung parts of the motorcycle.

2. A control valve arrangement according to claim 1 wherein the motorcycle suspension includes at least one locating arm and wherein the coupling means comprises: a pivot arm rotatably mounted on the locating arm; a first link connecting the pivot arm to the spring support, and a second link connecting the pivot arm to the control valve, one of said links being constituted by said tension spring.

3. A control valve arrangement according to claim 2 wherein the first link is an adjustable connecting rod and wherein the second link is said tension spring.

4. A control valve arrangement according to claim 1 including means for compensating the force applied to the control valve for changes in angle of the suspension strut which occur when the spring support is adjusted but the load on the suspension strut is unchanged.

5. A control valve arrangement according to claim 4 wherein the compensating means comprises an eccentric formed on the spring support for shifting the connection between the coupling means and the spring support radially of the suspension strut when the spring support is adjusted.

6. A control valve arrangement according to claim 4 wherein the compensating means comprises a screw-threaded connection between the coupling means and the spring support, said screw thread connection being rotated by the spring support during adjustment thereof.

* * * * *